(12) United States Patent
Idani

(10) Patent No.: US 6,854,095 B2
(45) Date of Patent: Feb. 8, 2005

(54) DESIGNING METHOD AND A MANUFACTURING METHOD OF AN ELECTRONIC DEVICE

(75) Inventor: Naoki Idani, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/446,692

(22) Filed: May 29, 2003

(65) Prior Publication Data
US 2003/0226127 A1 Dec. 4, 2003

(30) Foreign Application Priority Data
May 30, 2002 (JP) ...................................... 2002-158276

(51) Int. Cl.⁷ .............................................. G06F 17/50
(52) U.S. Cl. .............................................. 716/2; 716/7
(58) Field of Search .................................. 716/1, 2, 7

(56) References Cited

U.S. PATENT DOCUMENTS

| | | | |
|---|---|---|---|
| 6,317,353 B1 * | 11/2001 | Ikeda et al. ................... | 365/63 |
| 6,682,398 B2 * | 1/2004 | Meyer ............................ | 451/5 |
| 2002/0157076 A1 * | 10/2002 | Asakawa ....................... | 716/10 |
| 2002/0162082 A1 * | 10/2002 | Cwynar et al. ................ | 716/12 |
| 2003/0070149 A1 * | 4/2003 | Mizumasa ..................... | 716/5 |

FOREIGN PATENT DOCUMENTS

| | | |
|---|---|---|
| JP | 09102539 A | 4/1997 |
| JP | 101730035 A | 6/1998 |
| JP | 2001007114 A | 1/2001 |

* cited by examiner

*Primary Examiner*—Stacy A. Whitmore
(74) *Attorney, Agent, or Firm*—Arent Fox PLLC

(57) ABSTRACT

A designing method of an electronic device is provided. An STI structure, a wiring structure and the like defines a first area ratio range and a second area ratio range that are permissible in order to obtain satisfactory polishing results. A region to be polished is divided into first smaller areas, an area ratio of each of which is adjusted to meet the first area ratio range. The region to be polished is divided into second smaller areas, which are larger than the first smaller areas. An area ratio of each is adjusted to meet the second area ratio range, thereby providing satisfactory planarity of the region to be polished without producing depressions due to erosion caused by differing polishing speeds caused by differing densities of the regions to be polished.

11 Claims, 18 Drawing Sheets

INSUFFICIENT POLISHING          EXCESSIVE POLISHING (A)

| AREA RATIO | DIMENSIONS OF ACTIVATED REGION | | | | | |
|---|---|---|---|---|---|---|
| | 250μm×250μm | | 500μm×500μm | | 1000μm×1000μm | |
| | MINIMUM | REGION | MINIMUM | REGION | MINIMUM | REGION |
| 100% | 69.6 | DM | 63.9 | DM | — | — |
| 90% | 70.0 | DM | 69.0 | DM | — | — |
| 80% | 74.1 | DM | 74.1 | DM | 63.1 | DM |
| 70% | 79.5 | DM | 73.9 | DM | 68.4 | DM |
| 60% | 79.1 | DM | 73.6 | DM | 68.0 | DM |
| 50% | 78.8 | DM | 73.3 | DM | 73.4 | DM |
| 40% | 77.8 | AC | 78.7 | DM | 73.1 | DM |
| 30% | 76.8 | AC | 77.4 | AC | 71.8 | AC |
| 20% | 71.0 | AC | 70.0 | AC | 65.6 | AC |
| 10% | 68.9 | AC | 68.4 | AC | — | — |

AC: ACTIVATED REGION   DM: DUMMY REGION   UNIT: nm

| 79 | 78 | 75 | 73 | 73 | 74 | 78 | 78 | 78 | 77 | 74 | 72 | 72 | 73 | 77 | 77 |
|----|----|----|----|----|----|----|----|----|----|----|----|----|----|----|----|
| 80 | 79 | 76 | 74 | 74 | 76 | 79 | 79 | 79 | 78 | 75 | 73 | 73 | 74 | 77 | 78 |
| 81 | 80 | 77 | 75 | 75 | 77 | 79 | 80 | 80 | 79 | 76 | 74 | 74 | 75 | 78 | 79 |
| 81 | 80 | 78 | 76 | 76 | 77 | 80 | 80 | 80 | 79 | 77 | 75 | 74 | 76 | 78 | 79 |
| 82 | 81 | 78 | 77 | 76 | 78 | 80 | 81 | 81 | 80 | 77 | 75 | 75 | 76 | 79 | 79 |
| 82 | 81 | 79 | 77 | 77 | 78 | 80 | 81 | 81 | 80 | 77 | 75 | 75 | 76 | 79 | 79 |
| 82 | 81 | 79 | 77 | 77 | 78 | 80 | 81 | 81 | 80 | 78 | 76 | 75 | 77 | 79 | 80 |
| 82 | 81 | 79 | 77 | 77 | 78 | 80 | 81 | 81 | 80 | 78 | 76 | 75 | 77 | 79 | 80 |

UNIT: nm

| 73 | 69 | 68 | 68 | 70 | 73 | 76 | 77 | 77 | 76 | 72 | 70 | 70 | 71 | 74 | 75 |
|----|----|----|----|----|----|----|----|----|----|----|----|----|----|----|----|
| 74 | 70 | 69 | 69 | 71 | 74 | 77 | 78 | 78 | 77 | 73 | 71 | 71 | 72 | 75 | 76 |
| 75 | 71 | 70 | 70 | 72 | 76 | 78 | 79 | 78 | 77 | 74 | 72 | 72 | 73 | 76 | 76 |
| 75 | 72 | 70 | 70 | 72 | 76 | 78 | 79 | 79 | 78 | 75 | 73 | 72 | 74 | 76 | 77 |
| 75 | 72 | 68 | 68 | 73 | 76 | 78 | 79 | 79 | 78 | 75 | 73 | 73 | 74 | 77 | 77 |
| 76 | 73 | 69 | 69 | 73 | 76 | 79 | 79 | 79 | 78 | 76 | 74 | 73 | 74 | 77 | 77 |
| 76 | 73 | 71 | 71 | 73 | 77 | 79 | 80 | 79 | 78 | 76 | 74 | 73 | 75 | 77 | 77 |
| 76 | 73 | 71 | 71 | 73 | 77 | 79 | 80 | 79 | 78 | 76 | 74 | 73 | 75 | 77 | 78 |

UNIT: nm

FIG.20

|  |  | PREDETERMINED VALUE FOR 100 μm X 100 μm REGION | | |
|---|---|---|---|---|
|  |  | 40% | 60% | 80% |
| PREDETERMINED VALUE FOR 25 μm X 25 μm REGION | 70% | 36 | 38 | 74 |
| | 80% | 40 | 50 | 84 |
| | 90% | 86 | 86 | 110 |

UNIT: nm

DESIGNING METHOD AND A MANUFACTURING METHOD OF AN ELECTRONIC DEVICE

CROSS-REFERENCE TO RELATED APPLICATION

The present application is based on Japanese priority application No. 2002-158276 filed on May 30, 2002 with the Japanese Patent Office, the entire contents of that are hereby incorporated by reference.

BACKGROUND OF THE INVENTION

1. Field of the Invention

The present invention generally relates to a designing method of an electronic device that consists of an STI (Shallow Trench Isolation) structure, a wiring structure, and the like, to which a chemical mechanical polishing (CMP) method is applied, and a manufacturing method of the electronic device to which the above-mentioned designing method is applied. Here, the electronic device referred to in the present document is not limited to semiconductor devices, but thin film magnetic heads, CCD elements, semiconductor laser diodes, etc. to which the CMP method is applied, are included.

2. Description of the Related Art

In the electronic devices, such as semiconductor devices and magnetic heads, an element and a wiring structure that have a thin-film lamination structure are used. When manufacturing the element, the wiring structure, and the like, the CMP method is used in order to obtain planarity of the surface of the lamination.

For example, the CMP method is used in an STI process when manufacturing a MOS (Metal Oxide Semiconductor) device. The STI process embeds an insulating material and forms an element isolation region that electrically separates an element region from other element regions on a semiconductor board. Hereafter, the conventional STI process is explained, referring to FIG. 1.

Sections (A) through (E) of FIG. 1 show steps of the STI process.

With reference to Section (A) of FIG. 1, a silicon oxide film 12 is formed on a silicon board 11 by heat oxidation. Further, the silicon nitride film 13 is formed by a sputtering method, a CVD (chemical vapor deposition) method, etc.

Next, with reference to Section (B) of FIG. 1, the silicon nitride film 13 in the portion that is to be used as an element isolation region is removed using a photo lithography method and dry etching. Next, the silicon oxide film 12 and Si in the element isolation region are removed, and a trench (slot) 14 is formed by a dry etching method using the silicon nitride film 13 that remains as a mask.

With reference to Section (C) of FIG. 1, the inner wall of the trench 14 is heat-oxidized, a silicon oxide film 15 is formed, and a silicon oxide film 16 is formed by a CVD method using TEOS (tetra ethyl ortho-silicate), HDP (High Density Plasma), etc.

With reference to Section (D) of FIG. 1, the silicon oxide film 16 is polished by the CMP method until the silicon nitride film 13 becomes exposed. Here, the silicon nitride film 13 serves as a polishing stopper, the speed of polishing the silicon oxide film 16 being 3 to 4 times faster than the speed of polishing the silicon nitride film 13.

With reference to Section (E) of FIG. 1, the silicon nitride film 13 is removed by wet etching using phosphoric acid, etc. Further, the silicon oxide film 12 is removed by wet etching using HF. In this manner, element isolation regions 17, which are unpolished portions of the silicon oxide film 16, and element regions 18 are formed.

By the way, the degree of planarity (flatness) of a substrate that is polished by the CMP method is known to depend on how elements are laid out. That is, polishing progress of the silicon nitride film 13 may be different from place to place, depending on the density of the element regions 18 where the silicon nitride film 13 is formed. For example, where the element regions 18 are densely provided, volume of the silicon oxide film 16 deposited on the silicon nitride film 13 is large, and it takes a relatively long time to polish until the silicon nitride film 13 becomes exposed. Conversely, if the element regions 18 are sparsely provided, the volume of the silicon oxide film 16 on the silicon nitride film 13 is small, and it takes a relatively short time to polish until the silicon nitride film 13 becomes exposed. For this reason, time sufficient to polish one place may be insufficient or excessively long to polish other places.

To cope with this problem, technology to uniformly polish by the CMP method is indicated by JP, 9-102539, A (hereinafter, called "the conventional technology 1"), which is explained below with reference to FIG. 2.

Sections (A) through (F) of FIG. 2 show the STI process of the conventional technology 1.

With reference to Section (A) of FIG. 2, a silicon oxide film 22 and a silicon nitride film 23 are laminated in this sequence on a silicon board 21, and a trench 24 with a depth of 0.4 $\mu$m and an element region 25 in a convex shape are formed by the above-mentioned process.

Next with reference to Section (B) of FIG. 2, a silicon oxide film 26 is deposited by the CVD method. Here, the thickness of the silicon oxide film 26 to be deposited is set at about the same as the depth of the trench 24.

With reference to Section (C) of FIG. 2, the photoresist film 27 is applied to the silicon oxide film 26, patterning is carried out, and an opening is formed immediately above the element region 25. Here, the pattern of the photoresist film 27 is a reversal pattern of the element region 25 and the trench 24.

Next with reference to Section (D) of FIG. 2, the silicon oxide film 26 on the element region 25 is removed by anisotropic etching that uses the photoresist film 27 as a mask.

With reference to Section (E) of FIG. 2, the photoresist film 27 is removed, and the silicon oxide film 26 is etched by dry etching using Ar ion, incidence of the Ar ions being at a right angle to the substrate 21. In this manner, the silicon oxide film 26 becomes almost flat.

With reference to Section (F) of FIG. 2, the silicon oxide film 26 is removed by the CMP method until the silicon nitride film 23 becomes exposed. A flat polished surface of the silicon oxide film 26 and the silicon nitride film 23 is formed, and an element isolation region 28 is formed. Thus, according to the conventional technology 1 whereon the surface before polishing is almost flat, deformation of a polish cloth is suppressed, and variation in polish speed from place to place is minimized, thereby the planarity (flatness) of the surface after polishing is supposed to be improved.

Further, another technology for uniformly polishing by the CMP method is indicated by JP, 10173035, A, (hereinafter, called "the conventional technology 2"). According to the conventional technology 2, uniform polishing is supposed to be attained by setting the distance between each element at 100 μm or less, or alternatively, if the distance is greater than 100 μm, a dummy region is added such that the density of the elements is equalized.

However, in the case of the conventional technology 1, the mask process, the dry etching process, etc. for patterning the photoresist are required in addition to the conventional STI process, which causes manufacturing cost to rise.

In the case of the conventional technology 2, there is a problem as explained below. FIG. 3 shows an example of an arrangement of element regions and element isolation regions on a substrate 30 (not shown). With reference to FIG. 3, two element regions 31, each having a 500 μm long side, are formed, sandwiching an element isolation region 32 that is 1 micrometer long, length of the three element regions being about 1 mm in total. Further, to the right-hand side of FIG. 3, square-shaped element regions 33 whose one side is 0.5 micrometers long are formed with element isolation regions 34 that are 1 micrometer long inserted between adjacent square element regions 33, as shown in the expanded view, length of the regions being about 1 mm long in total. These element regions and element isolation regions are formed on the substrate 30 (refer to FIG. 4) in a laminating structure such as shown at Section (C) of FIG. 1. A silicon oxide film 35 on the surface of the substrate 30 is polished by the CMP method like the STI process explained in FIG. 1. FIG. 4 is a sectional drawing, showing the principal parts of the substrate 30 after polishing. With reference to FIG. 4, in the element region 31 whose one side is 500 micrometers long, the silicon oxide film 35 remains on a silicon nitride film 36, that is, polish is insufficient. Further, a dent (erosion) is generated in the element regions 33, each of which having a 0.5 micrometer long side, that is, polishing is excessive. Thus, the substrate 30 contains two undesired polishing states, i.e., insufficient polishing and excessive polishing. This problem cannot be solved, even if optimization of the amount of polishing, such as polishing time, is attempted.

To cope with the problem of the conventional technology 2, JP, 2001-7114 (hereinafter, called "the conventional technology 3") proposes that elements be laid out according to a specified area ratio in order to attain uniform polishing. The conventional technology 3 is relative to wiring structures; however, an explanation of the conventional technology 3 as adapted to element domains follows.

According to the conventional technology 3, uniform polishing is supposed to be obtained if an area ratio of each of predefined small regions falls within a predetermined range, the small regions being divisions of a region to be polished, and each of the small regions including element regions and element isolation regions. Further, the area ratio is expressed by the area of the element regions in the small region/the area of the small region. Specifically, for example, a region that is the polishing target is divided into a plurality of 100-μm squares as shown in FIG. 5, each of the squares being called a small region that consists of element regions and element isolation regions. In FIG. 5, a small region 51 with no background shade (white box) represents a small region where the area ratio is, e.g., 80%. A small region 52 with shaded background (shaded box) represents a small region where the area ratio is, e.g., 20%. Assuming that small regions having the 80% area ratio and small regions having the 20% area ratio are arranged at random, an area ratio that satisfies a predetermined planarity (flatness) is specified. That is, elements are arranged such that each small region satisfies the specified area ratio. In this manner, according to the conventional technology 3, uniform polishing is supposed to be obtained by making the area ratio of each small region fall within a predetermined range, where only one size of the small regions is considered.

However, if the 20% area ratio small regions 52 are provided contiguously over several mm, and then the 80% area ratio small regions 51 are provided contiguously over several mm as shown in FIG. 6, uniform polishing of all the small regions cannot be obtained, resulting in poor planarity (flatness). Specifically, polishing is insufficient for the 80% area ratio small regions, and excessive polishing is carried out for the 20% area ratio small regions, which problems cannot be solved simultaneously.

SUMMARY OF THE INVENTION

It is a general object of the present invention to provide a designing method and a manufacturing method that substantially obviate one or more of the problems caused by the limitations and disadvantages of the related art. Specifically, the present invention provides the designing method and the manufacturing method applicable to forming a STT structure, a wiring structure and the like by a CMP method, which realize satisfactory planarity (flatness) of a polished surface by preventing erosion and the like that occur due to polishing speed differences caused by differing element densities. The present invention is also to provide greater freedom in designing.

Features and advantages of the present invention will be set forth in the description that follows, and in part will become apparent from the description and the accompanying drawings, or may be learned by practice of the invention according to the teachings provided in the description. Objects as well as other features and advantages of the present invention will be realized and attained by the designing method and the manufacturing method particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides the designing method and the manufacturing method as follows.

The designing method of the present invention includes the following steps:

(1) dividing a layout region (target region) that is to be polished by the CMP method into a plurality of first small regions, each having the same area, where the layout region includes easy-to-polish regions, such as element isolation regions and wiring regions, where polishing speed is high, and hard-to-polish regions, such as substrate regions (regions other than the element isolation regions) and insulating layer regions, where polishing speed is low;

(2) obtaining a first area ratio of each of the first small regions, which is a ratio of an area occupied by the hard-to-polish regions to the total area of the first small region, comparing the first area ratio with a predetermined allowable area ratio that secures satisfactory planarity after polishing, expanding or adding easy-to-polish regions if the first area ratio is greater than the allowable area ratio, and expanding or adding the hard-to-polish regions if the first area ratio is smaller than the allowable area ratio;

(3) dividing the above-mentioned layout region into a plurality of second small regions of a different size from the first small regions; and (4) obtaining a second area ratio of each of the second small regions, which is a ratio of an area occupied by the hard-to-polish regions to the total area of the second small region, comparing the second area ratio with a predetermined allowable area ratio that secures satisfactory planarity after polishing, expanding or adding the easy-to-polish regions if the second area ratio is greater than the allowable area ratio, and expanding or adding the hard-to-polish regions if the second area ratio is smaller than the allowable area ratio.

Here, the allowable area ratio for the first small regions and the allowable area ratio for the second small regions are determined according to a process to be described later. It should be noted that the present invention is characterized by step (3) and step (4) above, where it is determined whether the second allowable area ratio that is different from the first allowable area ratio is sufficient concerning the second small regions, the size of which is different from the size of the first small regions.

According to the knowledge acquired by the inventor(s) of the present invention, which will be described in detail later, if an area ratio is specified for small regions of only one size, an allowable range of area ratios that provides satisfactory polishing becomes quite narrow. On the other hand, in the present invention, two area ratios are specified for the small regions of two sizes, where an allowable area ratio can be specified in a wide range for the small regions that are the smaller of the two sizes. That is, designing flexibility becomes greater. Further, as for the small regions that are the larger of the two sizes, the allowable area ratio is the same as the case where only one size of small regions is considered. In this manner, according to the present invention, depressions, such as erosion, produced by differing densities of the layout region causing polishing speed to differ from place to place, are prevented, resulting in satisfactory planarity of the polished surface and enhanced designing freedom.

The present invention provides the manufacturing method of an electronic device, wherein the design process of the present invention is used. Accordingly, depressions, such as erosion, produced by differing densities of the layout region causing polishing speed to differ from place to place, are prevented, resulting in satisfactory planarity of the polished surface and enhanced designing freedom.

In the above descriptions, although the area ratio is defined as a ratio of one region to the total area of the small region, the area ratio may be defined as a ratio of the other region to the total area of the small region. For example, the area ratio may be defined as a ratio of the area of the easy-to-polish regions to the total area of the small region, in which case, the range of the allowable area ratio should be adjusted accordingly.

BRIEF DESCRIPTION OF THE DRAWINGS

FIG. 12 is a table showing minimum thickness values of a silicon nitride film, and the name of a region that gives the minimum values;

FIG. 20 is a table showing maximum values of a step difference;

DESCRIPTION OF THE PREFERRED EMBODIMENTS

In the following, embodiments of the present invention will be described with reference to the accompanying drawings. First, an explanation is offered as to how the inventor(s) arrived at the present invention.

The inventor(s) polished semiconductor boards having various patterns that provide element regions and element isolation regions of a semiconductor device by the CMP method, and evaluated the amount of polishing.

Figure 1:
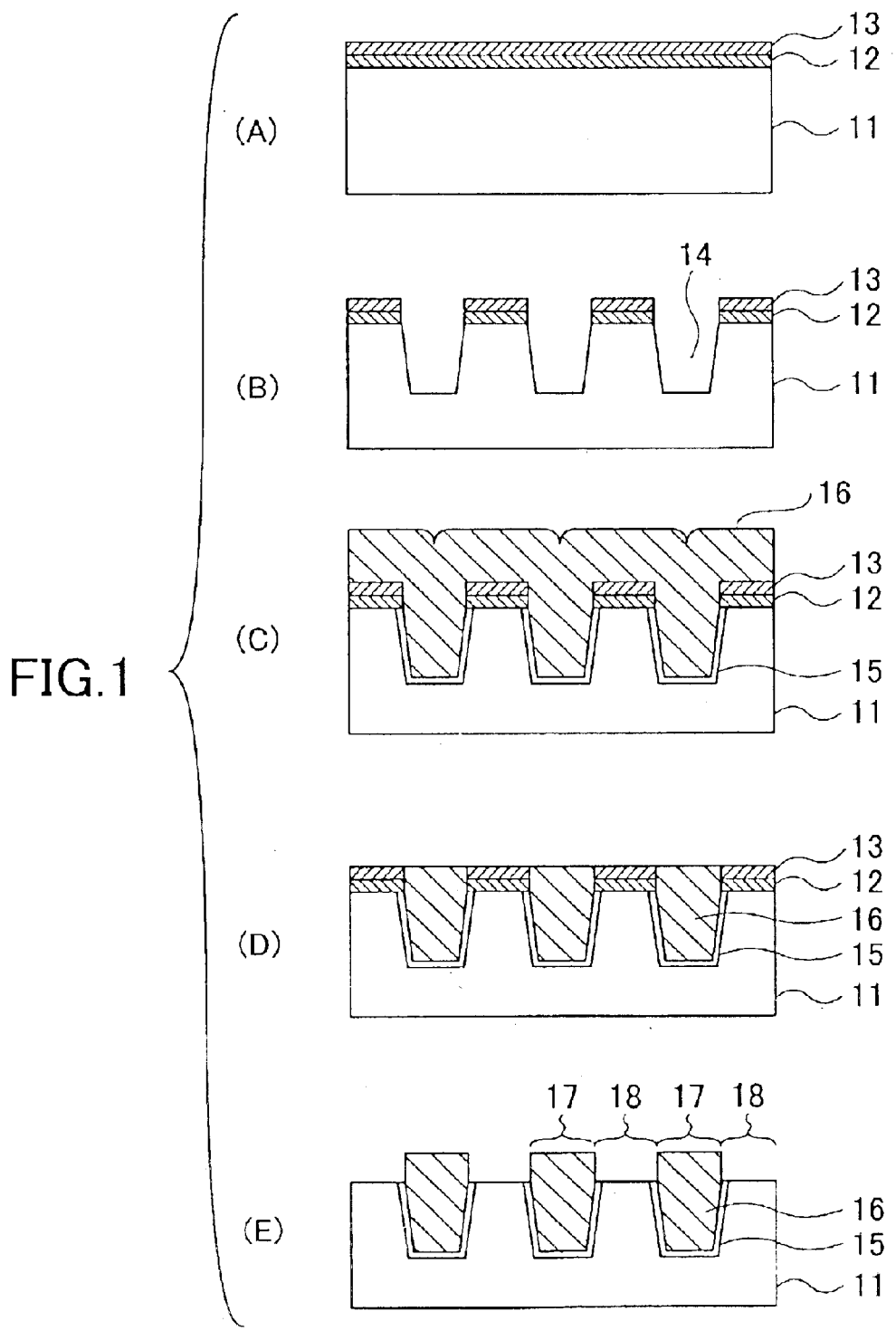
FIG. 1 shows a conventional STI process.
Figure 2:
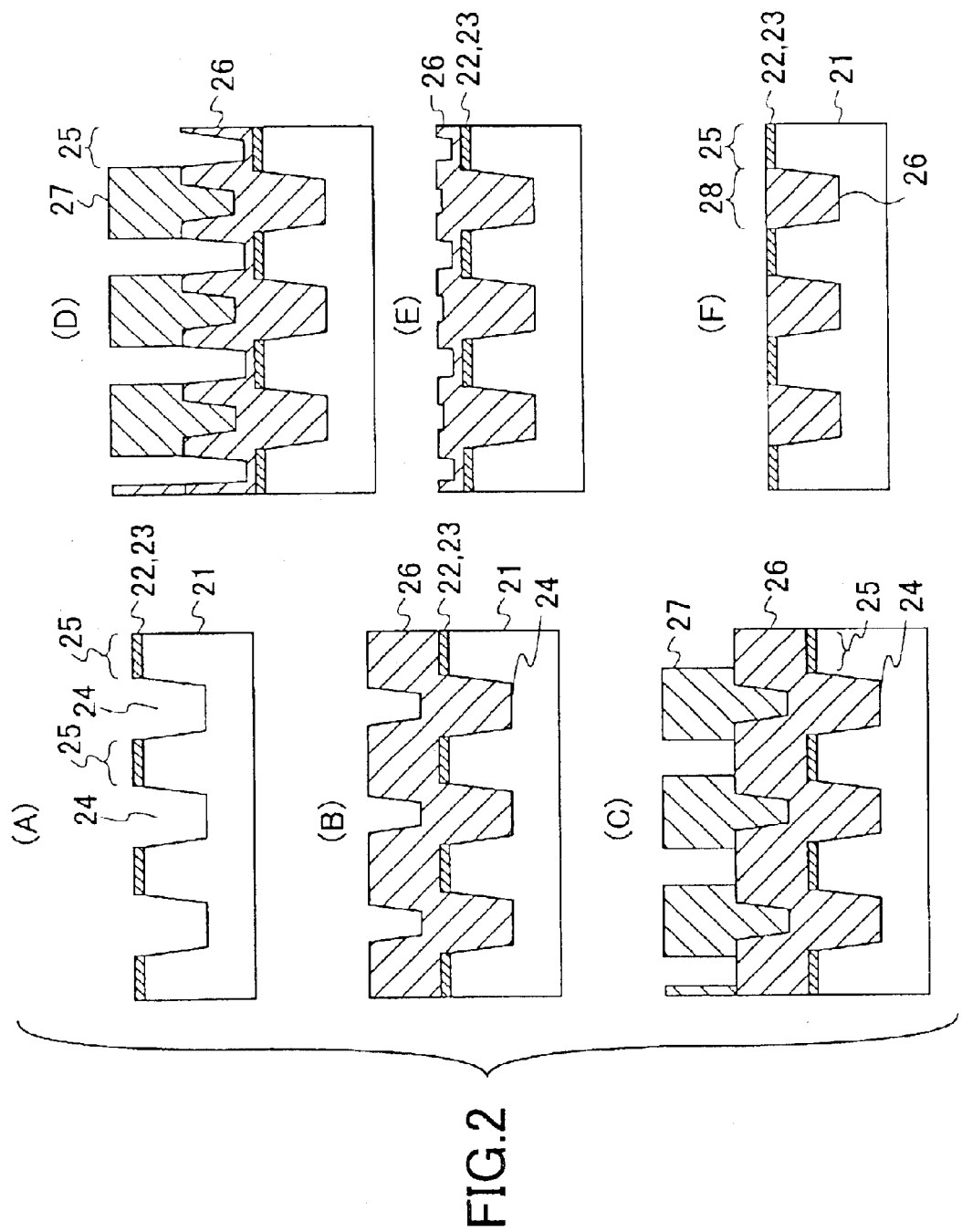
FIG. 2 shows the STI process of the conventional technology 1.
Figure 3:
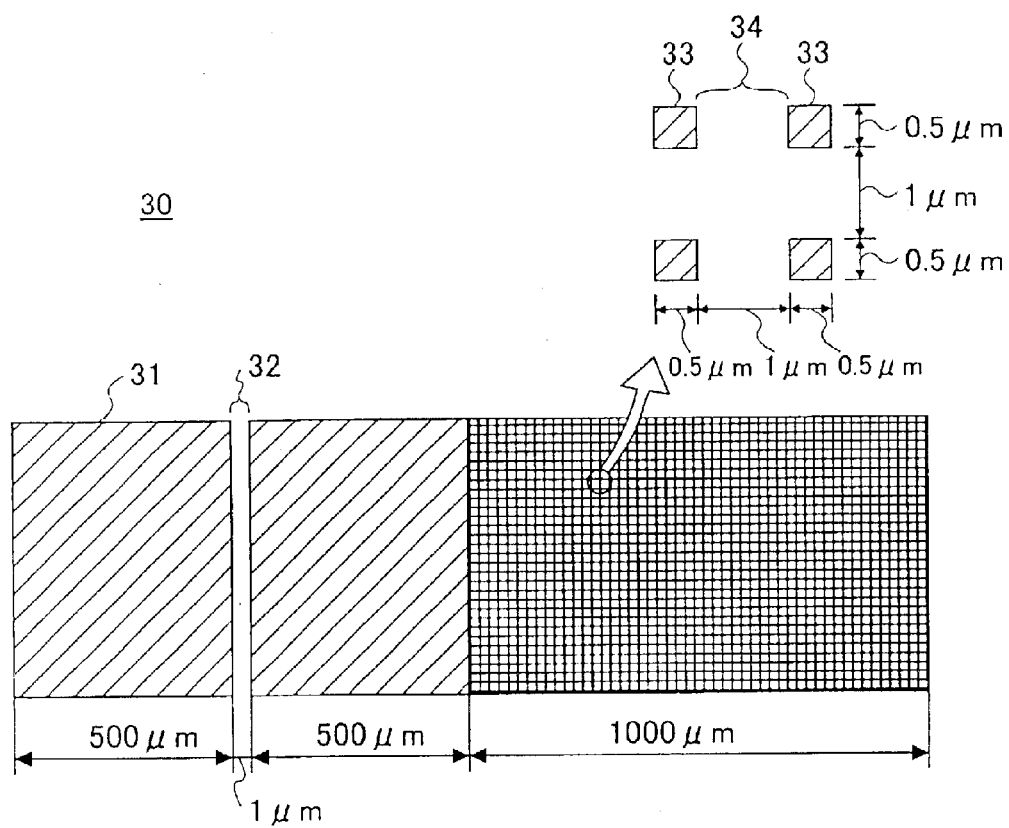
FIG. 3 shows an example of a substrate that has an element region and an element isolation region.
Figure 4:
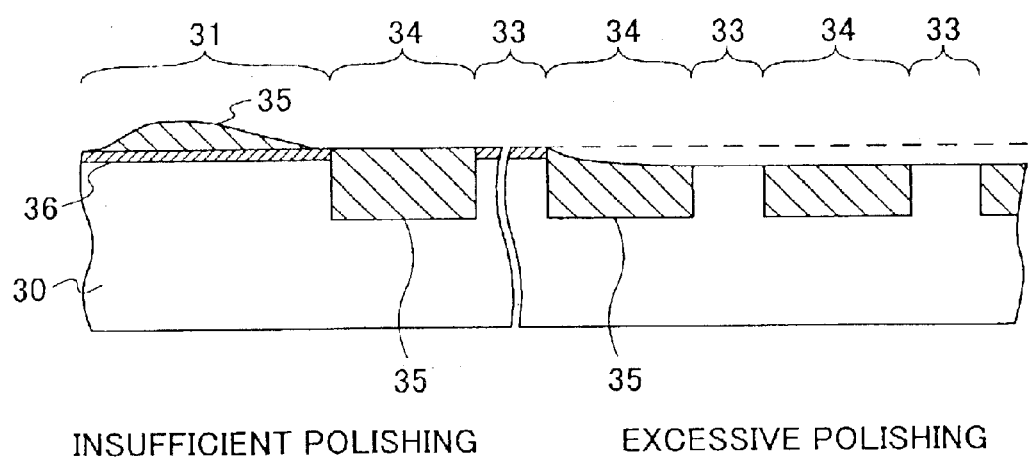
FIG. 4 is a sectional drawing showing the principal part of the substrate shown in FIG. 3 after polishing.
Figure 5:
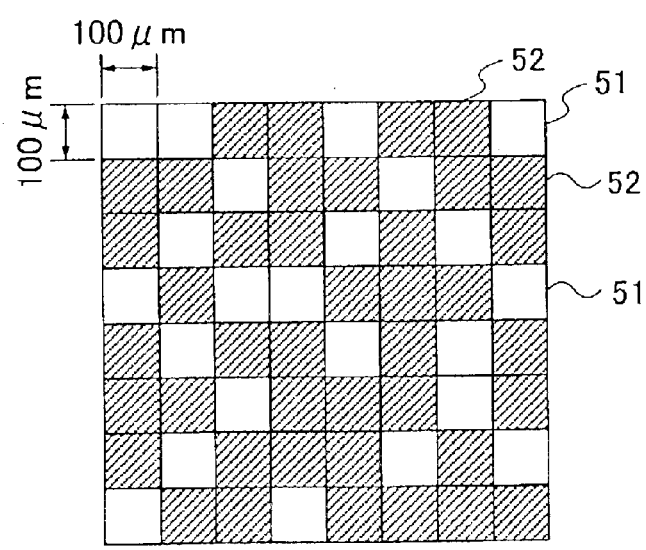
FIG. 5 shows how a layout pattern of a region that consists of an element region and an element isolation region is divided into small regions, each of which occupies a 100-$\mu$m square.
Figure 6:
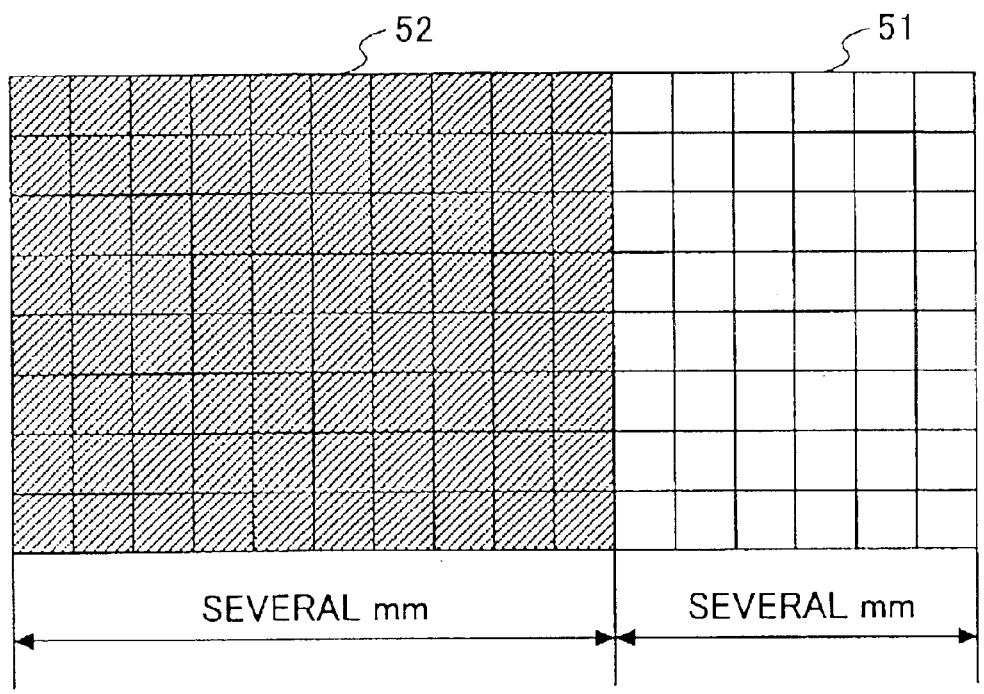
FIG. 6 shows another example of the layout pattern of the region that consists of an element region and an element isolation region.
Figure 7:
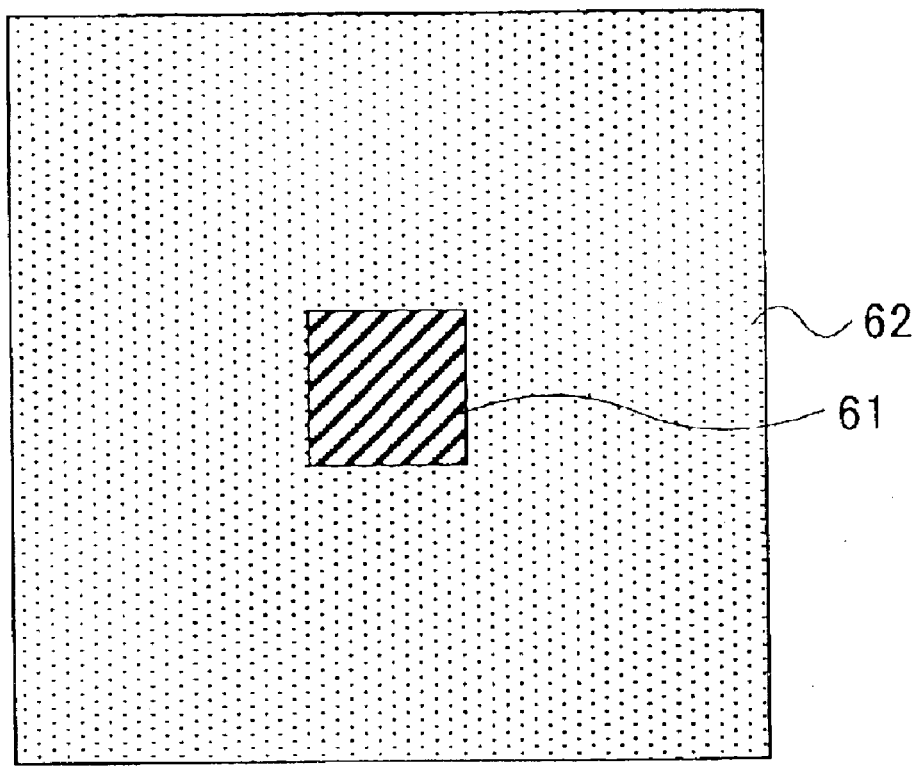
FIG. 7 is a plan drawing showing a semiconductor substrate used in experiments.

FIG. 7 is a plan drawing showing the semiconductor board used in the evaluation. With reference to FIG. 7, the semiconductor board 60 includes an activated region 61 at the center of the semiconductor board, and a dummy region 62 surrounding the activated region. The activated region 61 was made into a square, and three sizes were prepared, namely, 250×250 $\mu$m, 500×500 $\mu$m, and 1000×1000 $\mu$m.

Figure 8:
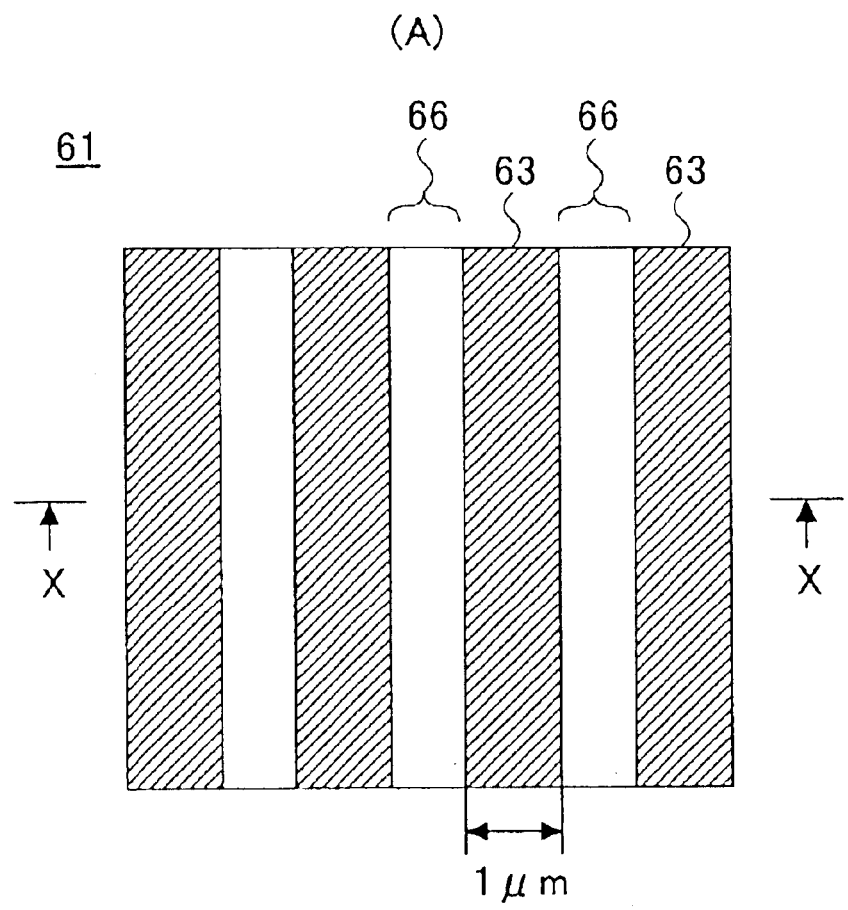
FIG. 8 is an expanded drawing showing an activated region.
Figure 8:
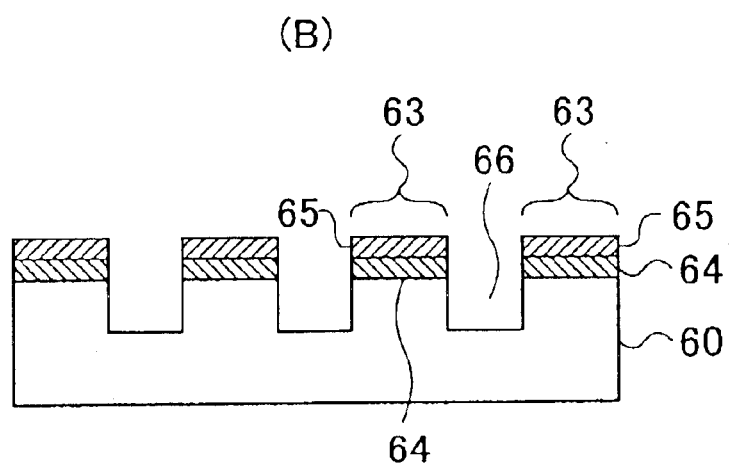

FIG. 8 shows details of the activated region 61, a plan drawing of which is given at Section (A) of FIG. 8. Section (B) of FIG. 8 is a sectional drawing, showing the cross-section of X—X indicated in Section (A) of FIG. 8. With reference to sections (A) and (B) of FIG. 8, the activated region 61 is formed by a pattern of lines and spaces. The lines represent element regions 63. The element regions 63 are convex parts of the substrate 60 of silicon, and include a silicon oxide film 64 with a thickness of 10 nm and a silicon nitride film 65 with a thickness of 85 nm that are laminated in this sequence. The spaces represent element isolation regions, and are characterized by trenches 66 that are 500 nm deep.

As for the activated region 61, ten patterns were prepared, each having different area ratios, namely 10% to 100% in 10% increments. The area ratio is defined as the area of the element region 63/(area of the element region 63+area of the element isolation region)×100, as mentioned above. Since in FIG. 8 each of the patterns consists of lines and spaces, the area ratio can also be expressed as width of the silicon nitride films 65 (width of the convex part)/(width of the silicon nitride films 65+width of the trenches 66 (width of concavity)). The width of the silicon nitride films 65 was fixed at 1 µm, and the width of the trenches 66 was set up so that a desired area ratio was obtained. For example, in the case where the area ratio should be 30%, the width of the trenches 66 was set to 2.38 µm, that is, (1 µm/(1 µm+2.38 µm))×100=30%. Further, in the case where the area ratio should be 100%, the silicon nitride film 65 was formed on the whole surface of the activated region 61.

Figure 9:
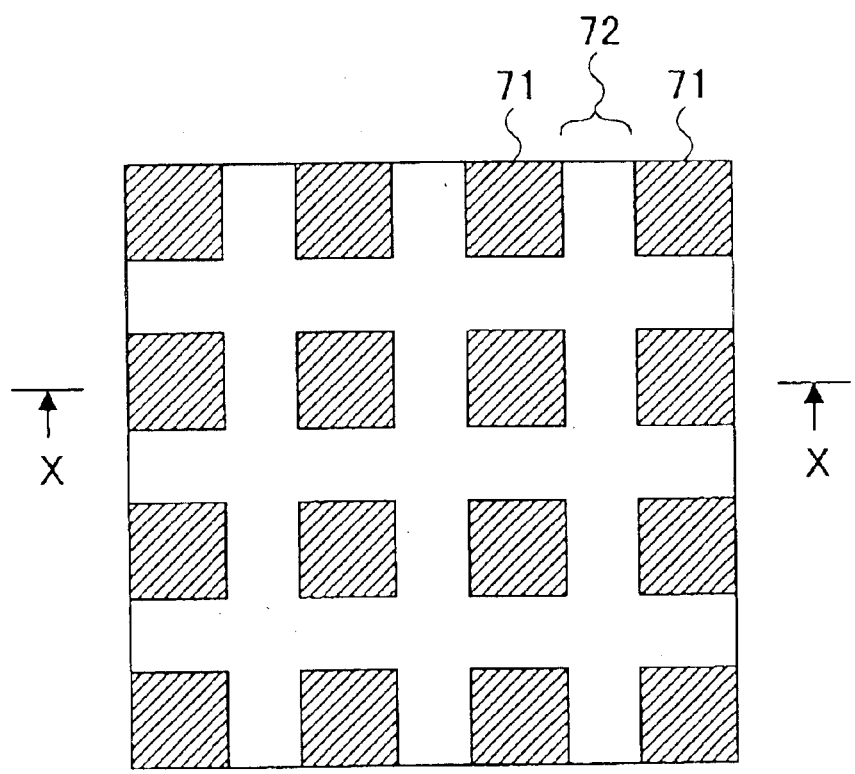
FIG. 9 is an expanded drawing showing a dummy region.
Figure 9:
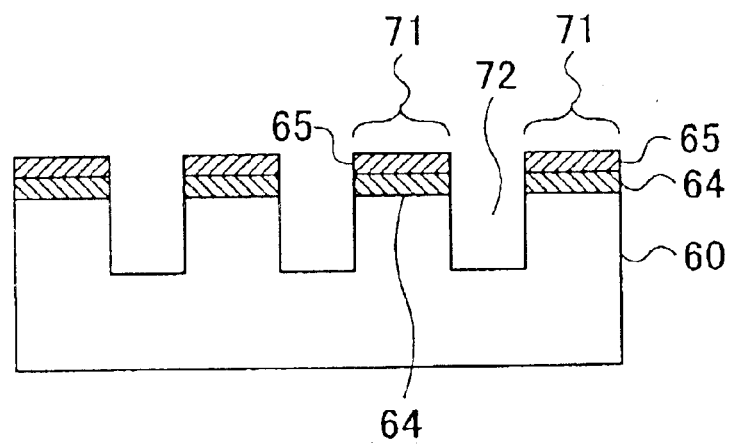

FIG. 9 shows details of the dummy region 62. Section (A) of FIG. 9 is a plan drawing, and Section (B) of FIG. 9 shows a cross-section of the X—X line indicated in Section (A) of FIG. 9. With reference to sections (A) and (B) of FIG. 9, the area ratio of the pattern of the dummy region 62 was set at 50%. The pattern is made of convex parts 71 consisting of squares of 1×1 µm and trenches 72 with a width of 0.58 µm, which are provided alternately. The convex part 71 was configured by a lamination of the silicon oxide film 64 with a thickness of 10 nm and the silicon nitride film 65 with a thickness of 85 nm, laminated in this sequence like the element region 63 of the activated region 61. The depth of the trenches 72 is 300 nm.

Figure 10:
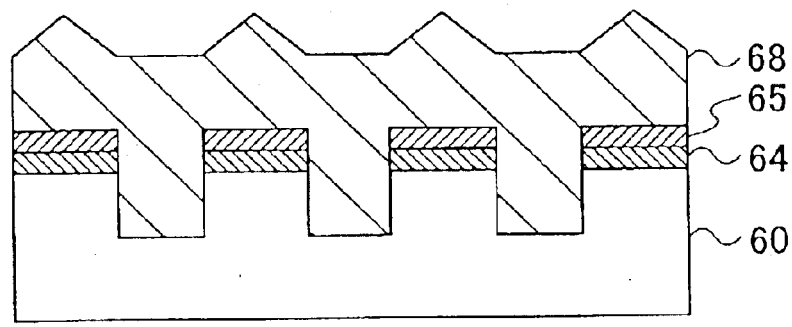
FIG. 10 is a sectional drawing showing the activated region wherein a silicon oxide film is formed.

Next, a silicon oxide film with a thickness of 500 nm was formed on the surface of the semiconductor board 60 by the CVD method, using high-density plasma. FIG. 10 is a sectional drawing showing the activated region 61 in which the silicon oxide film 68 is formed. With reference to FIG. 10, the silicon oxide film 68 is embedded in the trenches 66 of the activated region 61. The silicon oxide film 68 is similarly embedded in the trenches 72 of the dummy region 62.

Next, polishing by the CMP method was performed until the silicon oxide film on the silicon nitride film 65 was completely removed. A polishing agent used on this occasion consists of polishing grain that further consists of about 12 wt % of silica, and an additive agent mainly consisting of KOH such that pH is adjusted between 10 and 11. The polishing agent was supplied to a publicly known polishing machine at a rate of 0.2 liters per minute, and a polishing cloth IC1000 made by Rodel Nitta was used. Polishing pressure was set at 0.3 kg/cm2 and a polishing line speed at the center of the wafer was set at 1.3 m/s.

Figure 11:
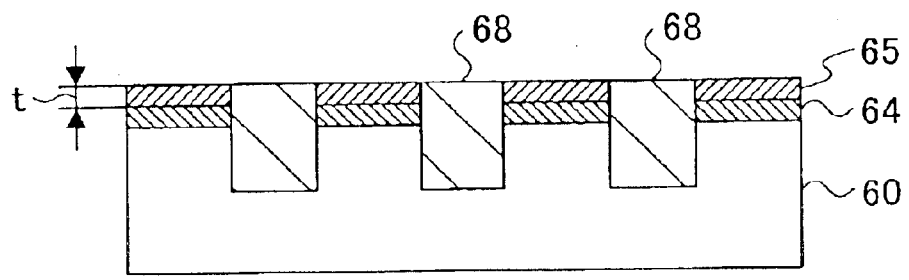
FIG. 11 is a sectional drawing showing the activated region after polishing.

FIG. 11 is a sectional drawing showing the activated region 61 after polishing. With reference to FIG. 11, the silicon nitride film 65 acts as a polishing stopper, since it has a polishing speed slower than the silicon oxide film 68. When the silicon oxide film 68 on the silicon nitride film 65 is completely polished, the silicon oxide film 68 and the silicon nitride film 65 form nearly the same surface, and a flat polished surface is formed.

At this juncture, film thickness t of the silicon nitride film 65 of the activated region 61 and the dummy region 62 was measured by an optical method, and the minimum values of the film thickness were determined. The minimum value was judged improper if it was 70 nm or less (excessive polishing), or if it was 83 nm or greater (insufficient polishing). As described above, the thickness of the silicon nitride film 65 before polishing was 85 nm.

FIG. 12 gives a table showing the minimum values of the film thickness t of the silicon nitride film 65 and the region that gave the minimum value for each of the three dimensions and each of the area ratios of the activated region 61. In FIG. 12, "AC" indicates that the corresponding minimum value occurred in the activated region, and "DM" indicates that the minimum value occurred in the dummy region. For example, when the dimensions of an activated region are 250×250 µm and the area ratio is 30%, the minimum value 76.8 nm occurred in the activated region.

As read from FIG. 12, area ratios that fall within the allowable range (over 70 nm and less than 83 nm) when the dimensions of the activated region 61 are 250×250 µm are 20% to 80%. Further, in the case of 500×500 µm, area ratios that fall within the allowable range are 30% to 80%. In the case of 1000×1000 µm, area ratios that fall within the allowable range are 30% to 50%. According to these results, the area ratio being 20%, for example, is permitted if the size of an activated region is 250×250 µm; however, the same area ratio is not acceptable in the cases of 500×500 µm and 1000×1000 µm. In this manner, the inventor(s) learned that insufficient and excessive polishing would occur even if the device layout were designed by specifying the area ratio for the 250×250 µm region, unless the area ratio is also specified for an area of different dimensions, such as 500×500 µm.

As above, the inventor(s) hereof have recognized and concluded that, in order to prevent insufficient and excessive polishing from occurring, and in order to obtain a satisfactory planarity of a polished surface in a CMP process, it is necessary to arrange elements, etc., in designing electronic devices, for example a semiconductor device, such that the area ratios fall within allowable ranges that are defined for a plurality of sets of dimensions of regions. Further, the inventor(s) have ascertained that it is desirable that the permissible area ratios be specified for a small region and another region that is 4 to 16 times the size of the small region.

In other words, when the permissible area ratios are defined for only one size of region, for example, 250×250 µm, the permissible area ratio becomes between 30% and 50%, if dimensions of the chip are 1000×1000 µm. However, when the permissible area ratios are defined, for example, for two sizes, for example 250×250 µm and 1000×1000 µm, the permissible area ratio for a region of 250×250 µm becomes between 20% and 80%. That is, design flexibility is enhanced, and an improved designing method is provided.
(First Embodiment)

Figure 13:
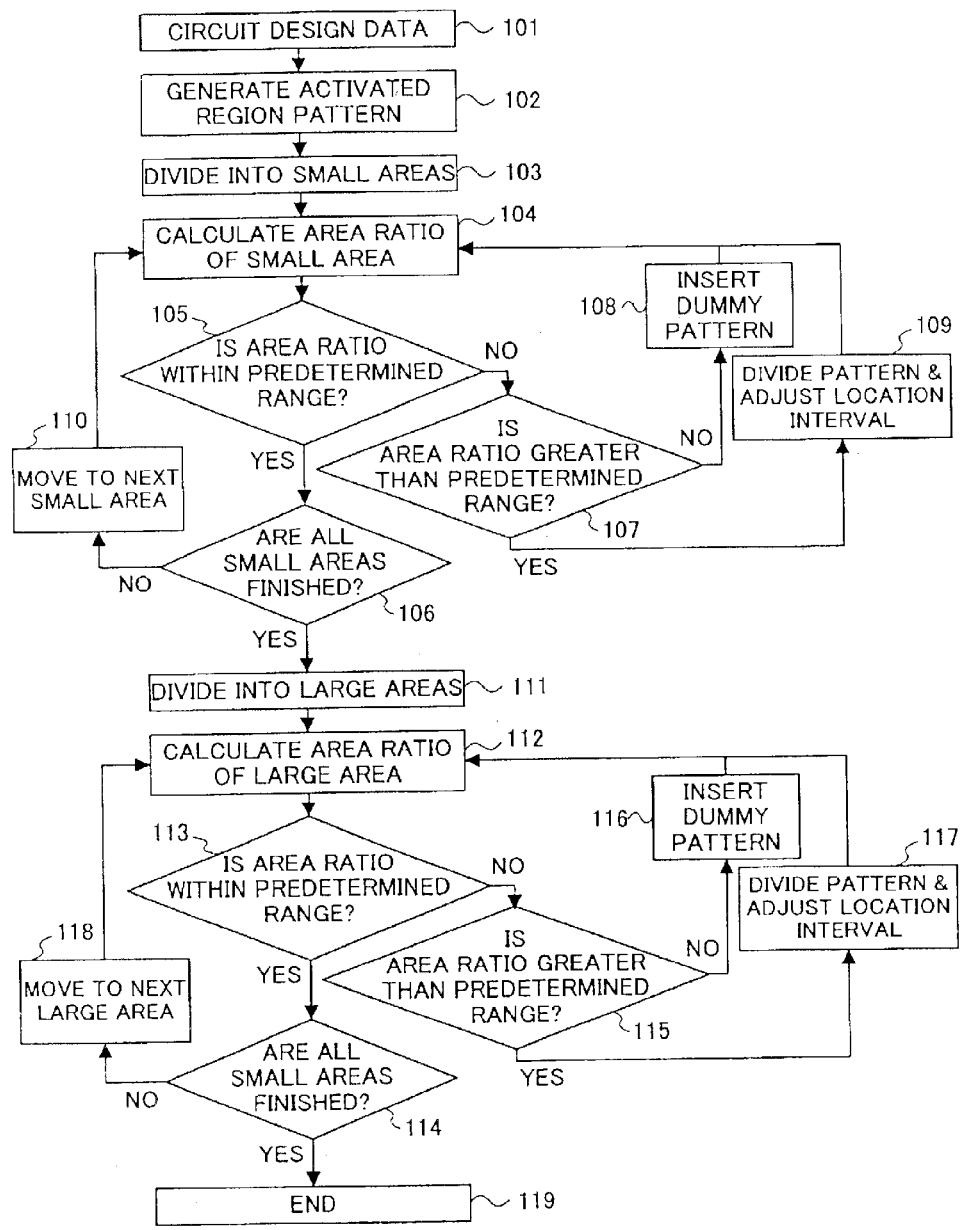
FIG. 13 is a flowchart showing an embodiment example of the designing method of the present invention.

Hereafter, based on the attached drawings, the electronic device designing method of the embodiment of the present invention is explained. FIG. 13 is a flowchart showing an example of the electronic device designing method of the embodiment of the present invention for a semiconductor device.

The semiconductor device designing method of the present embodiment is for automatically designing the pattern of the activated region of a MOS transistor that constitutes a semiconductor device. More specifically, the designing method is for automatically designing the pattern of the region that includes an element isolation region and an element region formed on a semiconductor substrate by an STI process.

First, circuit data determined from a function required of a semiconductor device is generated by a publicly-known design technique (Step 101).

Next, a pattern of activated regions of a MOS transistor is generated from the circuit data (Step 102).

Next, the activated region is divided into a plurality of small regions, each having an equal size (Step 103). Here, the size of the small region is smaller than the size of a large region that will be described in Step 111. For example, the size of the small region is set at 250×250 μm.

Next, an area ratio is calculated for each of the small regions (Step 104). The area ratio is expressed as (the area of element regions/the total area of the small regions)×100.

Next, the area ratio of each of the small regions is examined to determine whether it is within a predetermined range (Step 105). The predetermined range can be obtained by the technique explained above (how the present invention is conceived and culminated), and is specified corresponding to the size of the small regions. For example, the predetermined range may be set at between 20% and 80% for a small region of 250×250 μm.

If it is determined that the area ratio is within the range, the process proceeds to Step 106. Otherwise, it is determined whether the area ratio is greater or smaller than the predetermined range (Step 107).

If it is determined that the area ratio is smaller than the predetermined range, a dummy pattern of an element region is inserted (Step 108). The area ratio can be increased by inserting a dummy pattern. Otherwise, if it is determined that the area ratio is greater than the predetermined range, the pattern in the small region may be divided, or the arrangement interval of the regions for a function is adjusted (Step 109). Thereby, the area ratio can be reduced. Next, the process returns to Step 104, and the area ratio is calculated again. These steps are repeated until the area ratio becomes within the predetermined range.

Next, it is determined whether the area ratios of all the small regions have been checked (Step 106). If it is determined that not all the small regions has been checked, the process proceeds to the next small region (Step 110). That is, the process returns to Step 104, and the next small region is examined.

Next, when the area ratios of all the small regions are made to be within the predetermined range, the pattern of the activated region is divided into large regions (Step 111). It is preferable that the size of the large region be set greater than the size of the small region. If the size of the large region is set smaller than the size of the small region, re-adjustments will be necessary for the small regions after the area ratios of the large regions are adjusted, which requires increased time and effort, and causes the process to be complicated. By setting the size of the large region greater than the size of the small region, efficient designing is possible. Specifically, it is especially desirable that the size of the large region be set at 4 to 16 times (e.g., 1000×1000 μm) the size of the small region. By setting the size of the large region in this manner, the difference between the predetermined range that is permitted for the area ratio of the small region and the predetermined range that is permitted for the area ratio of the large region becomes great, which gives a wider permissible range for the small regions, contributing to enhanced design flexibility.

Here, the area ratio is calculated for each of the large regions (Step 112). The area ratio is expressed as (the area of element regions/the total area of the large region)×100.

Next, it is predetermined whether the area ratio of the large region is within a predetermined range (Step 113). The predetermined range can be obtained by the technique explained above (how the present invention is conceived and culminated), and is specified corresponding to the size of the large region. For example, the predetermined range is set as between 30% and 50% for the large region of 1000×1000 μm.

If it is determined that the area ratio is within the predetermined range, the process proceeds to Step 114. Otherwise, if it is determined that the area ratio is outside the predetermined range, it is determined whether the area ratio is greater or smaller than the predetermined range (Step 115).

If it is determined that the area ratio is smaller than the predetermined range, a dummy pattern is inserted (Step 116). Otherwise, if it is determined that the area ratio is greater than the predetermined range, the pattern of the large region is divided, or the arrangement interval of the regions of a function is adjusted (Step 117). Then, the process returns to Step 112, and the area ratio is calculated again. These steps are repeated until the area ratio becomes within the predetermined range.

Next, it is determined whether the adjustment of the area ratios of all the large regions is completed (Step 114). If it is determined that not all the large regions are examined, the process is repeated for the next large region (Step 118). That is, the process returns to Step 112.

When the area ratios of all the large regions are made to be within the predetermined range, the process is finished (Step 119).

Here, in the case that the area ratio of any large region does not come within the predetermined range, the predetermined range of the area ratio of the small regions is changed, and the process of Step 104 through Step 119 is performed again.

Although the pattern designing explained in the present embodiment refers to the activated region, the explained pattern designing is also applicable to any other region, such as a wiring region, to which CMP(s) is applied.

In manufacturing embodiment 1, an activated region of a MOS transistor is formed, which includes an element region and an element isolation region, by applying the first embodiment of the designing method.

Figures 14, 15:
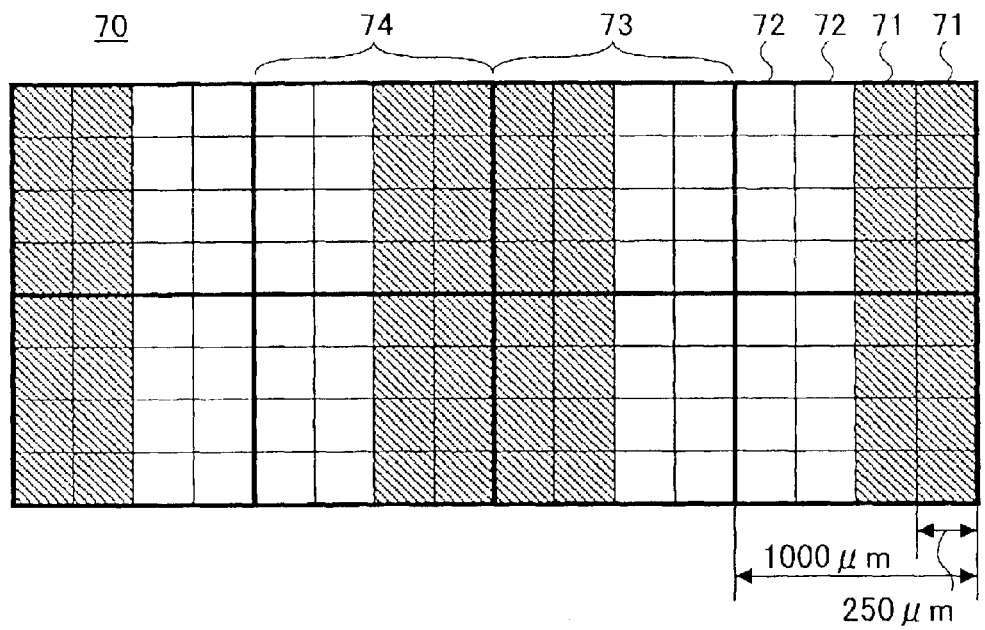
FIG. 14 is for explaining an area ratio of the activated region of a MOS transistor according to the embodiments of the present invention.
FIG. 15 is a table showing film thickness of the silicon nitride film of each small region after polish concerning the embodiments of the present invention.

FIG. 14 is a drawing showing the area ratio of the activated region 70 of the MOS transistor of the present manufacturing embodiment. With reference to FIG. 14, the size of each of small regions 71 and 72 is 250×250 μm, and the size of each of large regions 73 and 74 delimited by thick lines is 1000×1000 μm. Further, the area ratio of each of the hatched small regions 71 is 80%, and the area ratio of each of the white small regions 72 is 20%.

The pattern 70 of the activated region, shown in FIG. 14, is obtained by applying the designing method of the first embodiment. In the designing method, the size of each of the small regions is made 250×250 μm, and the predetermined range of the area ratio of the small regions is specified as between 20% and 80%. Further, the size of each of the large regions is made 1000×1000 μm, and the predetermined range of the area ratio of the large regions is specified as between 30% and 50%. These predetermined ranges are specified such that film thickness of the silicon nitride film after polishing becomes between 70 nm and 83 nm.

With reference to FIG. 14, the pattern 70 obtained by applying the designing method of the first embodiment is characterized by the area ratio of the 250×250 μm small regions 71 and 72 ranging between 20% and 80%, and the area ratio of the 1000×1000 μm large regions 73 and 74 ranging between 30% and 50%. Although the area ratio of the large region is defined by (the element region area/the total area of the large region)×100 as mentioned above, here, the area ratio of each of the large regions is obtained by averaging the area ratios of the small regions that are contained in each of the large regions for simplicity purposes.

Then, the activated region of the pattern 70 is formed on a semiconductor board, and polishing is carried out for forming an STI structure according to the method explained above (how the present invention was conceived and culminated).

FIG. 15 shows film thickness (in unit of nm) of the silicon nitride film after polishing according to the present embodiment. In FIG. 15, the film thickness is given for each of the small regions 71 and 72 of the pattern 70. Shaded regions correspond to the small regions 71, the area ratio of which is 80%, and white regions correspond to the small regions 72, the area ratio of which is 20%.

With reference to FIG. 15, film thickness of the silicon nitride film in all the small regions falls within the predetermined range between 70 nm and 83 nm.

Figures 16, 17:
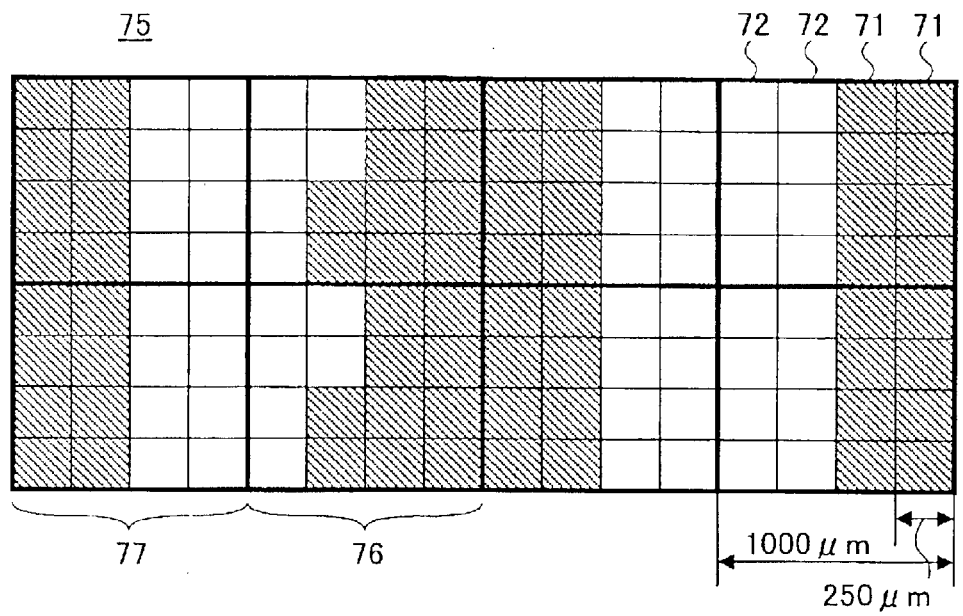
FIG. 16 is for explaining an area ratio of the activated region of a MOS transistor that serves as a comparative sample.
FIG. 17 is a table showing film thickness of the silicon nitride film of each small region after polishing concerning the comparative sample.

FIG. 16 shows the area ratios of an activated region 75 of a MOS transistor, which is outside of the present invention, and presented as comparative example 1. In FIG. 16, the size of each of the small regions 71 and 72 is 250×250 μm, hatched regions 71 represent small regions, the area ratio of which is 80%, and white regions 72 represent small regions, the area ratio of which is 20%, like FIG. 14.

With reference to FIG. 16, all the area ratios of the 250×2.50 μm small regions 71 and 72 of the pattern 75 of the activated region fall within the predetermined range of 20% to 80%. However, the area ratio of a 1000×1000 μm large region 76 becomes outside of the predetermined range of between 30% and 50%. In this example, the large region 76 shown in FIG. 16 has an area ratio of 57.5%.

Then, the activated region of the pattern 75 is formed on a semiconductor board, and polishing is carried out for forming an STI structure, like in manufacturing embodiment 1.

FIG. 17 shows film thickness of the silicon nitride film after polishing concerning comparative example 1. In FIG. 17, the film thickness is presented for each of the small regions 71 and 72 of the pattern 75. Shaded regions correspond to the small regions 71, the area ratio of which is 80%, and white regions correspond to the small regions 72, the area ratio of which is 20%.

As evidenced from FIG. 17, the film thickness of the silicon nitride film is smaller than 70 nm in the large region 79 that is adjacent to the large region 78 that corresponds to the large region 76 (FIG. 16) where the area ratio is outside of the predetermined range of between 70 nm and 83 nm.

As described above, according to manufacturing embodiment 1 and comparative example 1, even if the area ratio of the 250×250 μm small regions falls within the predetermined range of between 20% and 80%, the film thickness of the silicon nitride film does not fall within the predetermined range, if the area ratio a 1000×1000 μm large region is outside of the corresponding predetermined range of between 30% and 50%. Therefore, it is highly effective to design an activated region by dividing the activated region into different sizes of smaller regions, and to prepare a predetermined range of the area ratio for each of the smaller regions. In this manner, the film thickness within the predetermined range is obtained all over the polished region, that is, the semiconductor board having satisfactory planarity of the polished surface is obtained without depressions due to erosion produced by differing densities of regions that causes the polishing speeds to differ.

(Second Embodiment)

Figure 18:
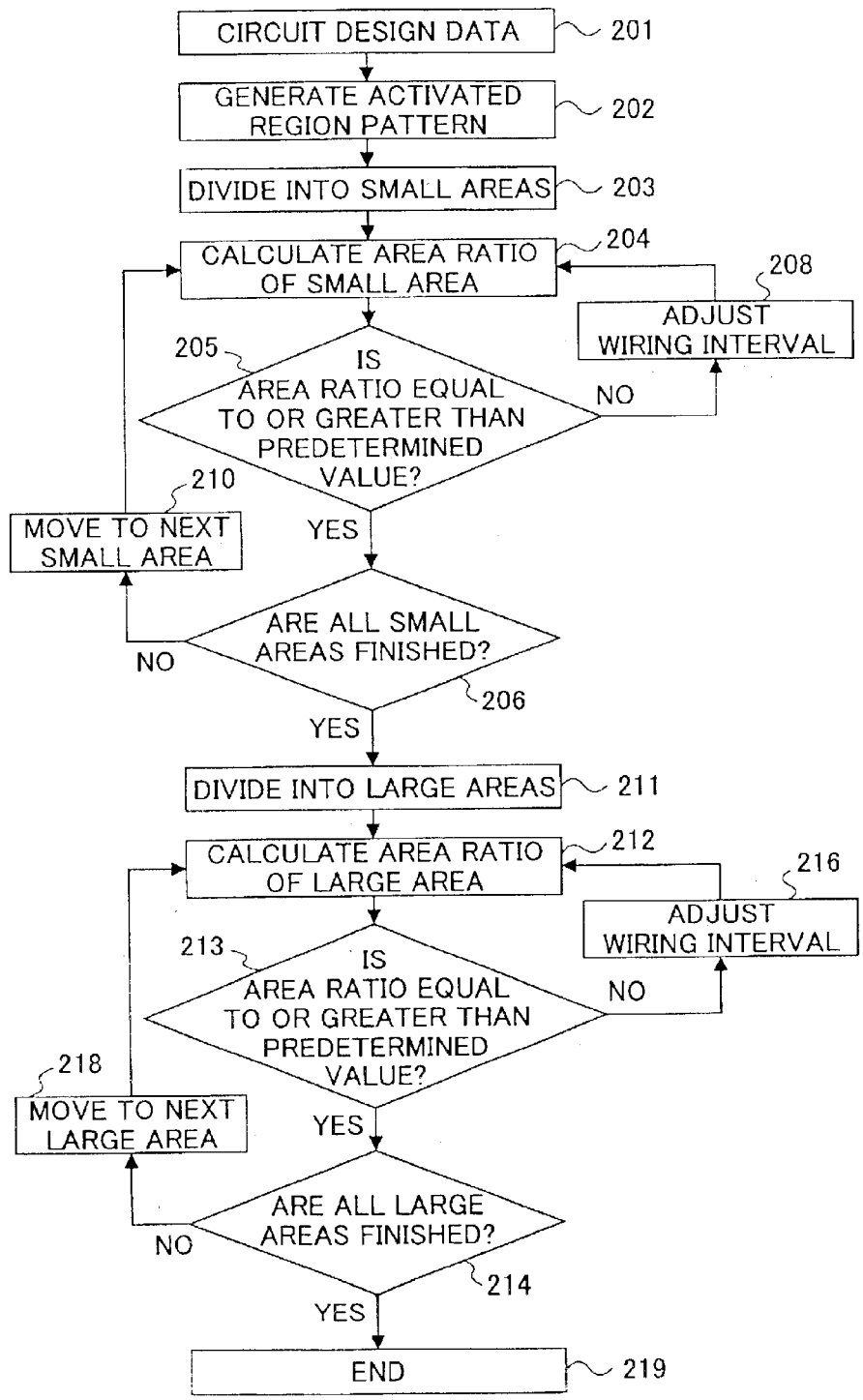
FIG. 18 is a flowchart showing another example of the designing method of the embodiments of the present invention.

Hereafter, the designing method of the electronic device that is the second embodiment of the present invention is explained, based on the attached drawings. FIG. 18 is a flowchart showing an example of another designing method, which is the second embodiment of the present invention.

The second embodiment of the designing method of the semiconductor device is for automatically designing a pattern of a wiring region that has damascene and dual damascene structures. Specifically, the second embodiment is for automatically designing a pattern of a wiring layer formed on an inter-layer insulation film.

First, circuit data according to a function required of a semiconductor device is generated by a publicly-known design technique (Step 201).

Next, a pattern of a wiring region is generated from the circuit data (Step 202).

Next, the pattern of the wiring region is divided into small regions, each having the same area (Step 203). Here, each of the small regions is made smaller than each of large regions described later in reference to Step 211. For example, size of each of the smaller regions is set at 25×25 μm.

Next, the area ratio is calculated for each of the small regions (Step 204). The area ratio is expressed as (the area of an upper surface of the wiring layer/the total area of the small region)×100. Here, the upper surface of the wiring layer is the upper surface of the wiring layer after being polished by the CMP method.

Next, it is determined whether the area ratio of the small region is equal to or smaller than a predetermined value for the small regions (Step 205). The predetermined value is obtained in the manner described above in reference to how the present invention is conceived and culminated, and as applied to forming the wiring structure. For example, when the maximum of a level difference of a polished surface is set to 50 nm, the predetermined value of the area ratio can be set at 80% for a 25×25 μm small region.

If an area ratio is determined to be equal to or lower than the predetermined value for the small regions, the process proceeds to Step 206. Otherwise, if the area ratio is determined greater than the predetermined value, the wiring interval of the small region is adjusted, e.g., expanded (Step 208), and the process returns to Step 204, where the area ratio is calculated again. These steps are repeated until the area ratio becomes below the predetermined value.

Next, it is determined whether the area ratio of all the small regions is completed (Step 206). If not all the small regions have been examined, the process selects the next small region (Step 210), and returns to Step 204 for checking the next small region.

Next, when the area ratio of all the small regions is determined to be equal to or lower than the predetermined value, the pattern of the wiring region is divided into large regions, the size of which is different from the small regions (Step 211). For the same reason as explained in reference to the first embodiment, the size of the large regions is set greater than the small regions. Specifically, it is desirable to set the size of the large regions 4 to 16 times the size of the small regions. For example, the size of each of the large regions is set at 100×100 μm.

Next, the area ratio is calculated for each of the large regions (Step 212). The area ratio is expressed as (the area of the upper surface of a wiring layer/the total area of the large region)×100.

Next, it is determined whether the area ratio of the large region is equal to or less than a predetermined value for the large regions (Step 213). The predetermined value is obtained in the manner described above in reference to how the present invention is conceived and culminated, and as applied to forming the wiring structure. For example, the predetermined value is set at 40% for a 100×100 μm large region.

If the area ratio is determined to be equal to or lower than the predetermined value, the process progresses to Step 214. Otherwise, if the area ratio is determined to be greater than the predetermined value, the wiring interval in the large region is adjusted, e.g., expanded (Step 216). Then, the process returns to Step 212, and the area ratio is calculated again. These steps are repeated until the area ratio becomes equal to or lower than the predetermined value.

Next, it is determined whether the area ratio of all the large regions has been examined (Step 214). If it is determined that the area ratio of all the large regions has not been examined, the process selects the next large region (Step 218). Then, the step returns to Step 212 for checking the next large region.

The process is ended when the examination of the area ratios of all the large regions is completed (Step 219).

Here, in the second embodiment, although only the maximum predetermined values of the area ratio for a small region and a large region are specified, the minimum values may also be defined, if necessary, like the first embodiment.

In manufacturing embodiment 2, a wiring structure is formed by designing a wiring pattern applying the second embodiment of the designing method.

In manufacturing embodiment 2, the size of the small region is set at 25×25 $\mu$m, the size of the large region is set at 100×100 $\mu$m, and the second embodiment is applied. Further, three predetermined values of the area ratio for the small region are prepared, namely, 70%, 80%, and 90%, and three predetermined values of the area ratio for the large region are prepared, namely, 40%, 60%, and 80%. By combining the predetermined values for the small regions and for the large regions, 9 circuit patterns are generated, and planarity of the polished surface, which is the upper surface of the wiring structure, is examined. Here, the planarity is expressed by a level difference between a Cu film 87 and an insulation layer 84 that form the wiring layer, as will be described later. A predetermined acceptable level difference is set at 50 nm or less. Using the patterns generated as above, wiring structures are produced and the level difference is measured.

Figure 19:
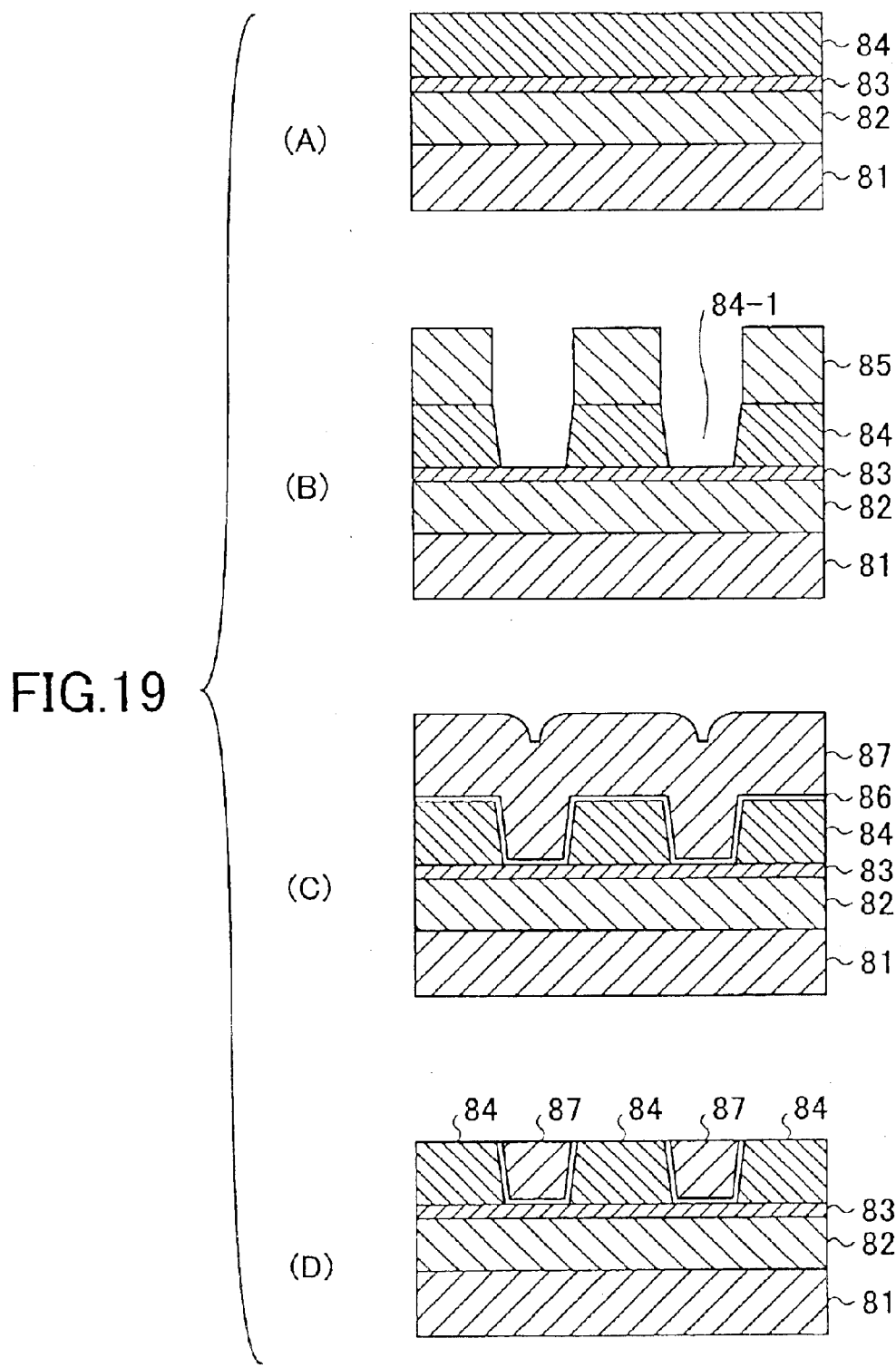
FIG. 19 shows a process for forming a wiring structure according to an embodiment of the present invention.

FIG. 19 is shows a process for forming the wiring structures.

With reference to Section (A) of FIG. 19, an insulated layer 82 that consists of SiO2 with a thickness of 300 nm is formed on a silicon board 81 by the plasma CVD method, and an etching stopper layer 83 that consists of SiN with a thickness of 20 nm is formed by the plasma CVD method on the insulated layer 82. Another insulation layer 84 that consists of SiO2 with a thickness of 450 nm is formed by the plasma CVD method on the etching stopper layer 83.

With reference to Section (B) of FIG. 19, resist 85 is applied, and patterning is carried out by the photo lithography method. Next, a part of the insulation layer 84 is polished by dry etching using the resist 85 as a mask, and a trench 84-1 for embedding Cu is formed.

In reference to Section (C) of FIG. 19, a diffusion barrier layer 86 that consists of TaN with a thickness of 25 nm is formed by the sputtering method, on which, a Cu film (not shown) with a thickness of 20 nm is formed as a plating base by the sputtering method, and a Cu film 87 with a thickness of 1.3 $\mu$m is formed by the plating method on the Cu film that is not shown.

With reference to Section (D) of FIG. 19, the Cu film 87 is polished by the CMP method, and the diffusion barrier layer 86 on the insulation layer 84 is completely removed such that the insulation layer 84 is exposed. In this manner, the wiring structure, which consists of the wiring layer of the Cu film 87, and the insulation layer 84 that separates the wiring layer parts, is formed. Here, in the CMP method, a polishing agent that provides a higher polishing speed for Cu than for TaN and SiO2 is adopted.

The level differences of the polished surface were evaluated using an AFM (atomic force microscope). Here, the level difference is expressed by the difference between the lowest point of a depression of a region where each wiring pattern is formed and the upper surface of the insulation layer 84 surrounding the wiring pattern, for example, the insulation layer 84 that does not contain a wiring layer.

FIG. 20 shows the maximums of the level difference.

With reference to FIG. 20, four combinations that are acceptable, that is, combinations that give a smaller level difference than the permissible maximum 50 nm, are determined. Namely, the acceptable combinations are (25×25 $\mu$m, 100×100 $\mu$m)=(70%, 40%), (70%, 60%), (80%, 40%), and (80%, 60%). The combination where the predetermined value becomes the greatest, that is, the designing flexibility becomes the greatest is (25×25 $\mu$m, 100×100 $\mu$m)=(80%, 60%). That is, by designing a pattern such that the area ratio falls 80% or less in a 25×25 $\mu$m region, and the area ratio falls 60% or less in a 100×100 $\mu$m region, the level difference is controlled to be 50 nm or less.

In contrast, if the area ratio is defined relative to only one size of divided regions, for example, small regions, the predetermined maximum value of the area ratio should be 60% in order to control the level difference to 50 nm or less. On the other hand, if two maximum values are defined for two sizes of divided regions like the embodiments of the present invention, for example, 25×25 $\mu$m small regions and 100×100 $\mu$m large regions, the area ratio can be expanded to 80% in the 25×25 $\mu$m small regions, enhancing the design flexibility of a pattern. Further, since the predetermined maximum value of the area ratio is specified to the regions of each, the pattern density of the wiring region can be equalized more precisely than the case where the wiring region is divided into only one size of smaller regions, and a satisfactory planarity of the polished surface is obtained.

Manufacturing embodiment 3 is an example of the designing method of a compounded type thin film magnetic head. Specifically, the method is for designing an arrangement of a thin film magnetic head on a substrate, like a semiconductor manufacture process.

First, the pattern of the arrangement on the substrate of the thin film magnetic head is determined by the designing method described in the first embodiment, where the size of each small region of the first embodiment is set to 250×250 $\mu$m, and the size of each large region is set to 1000×1000 $\mu$m, for example. Further, in this manufacturing embodiment 3, the predetermined range of the area ratio of a small region is set to 10% to 20%, and the predetermined range of the area ratio of a large region is set to 1% to 10%. The predetermined values are set such that the level difference between an Al$_2$O$_3$ film 96 shown at (D) of FIG. 21 (described later) and a NiFe film 95 is controlled to be 30 nm or less. Here, the area ratio is expressed by (the area of the NiFe film 95/area of small regions or large regions)×100.

Next, a lower shield of a reproduction head of the thin film magnetic head is formed using this pattern.

Figure 21:
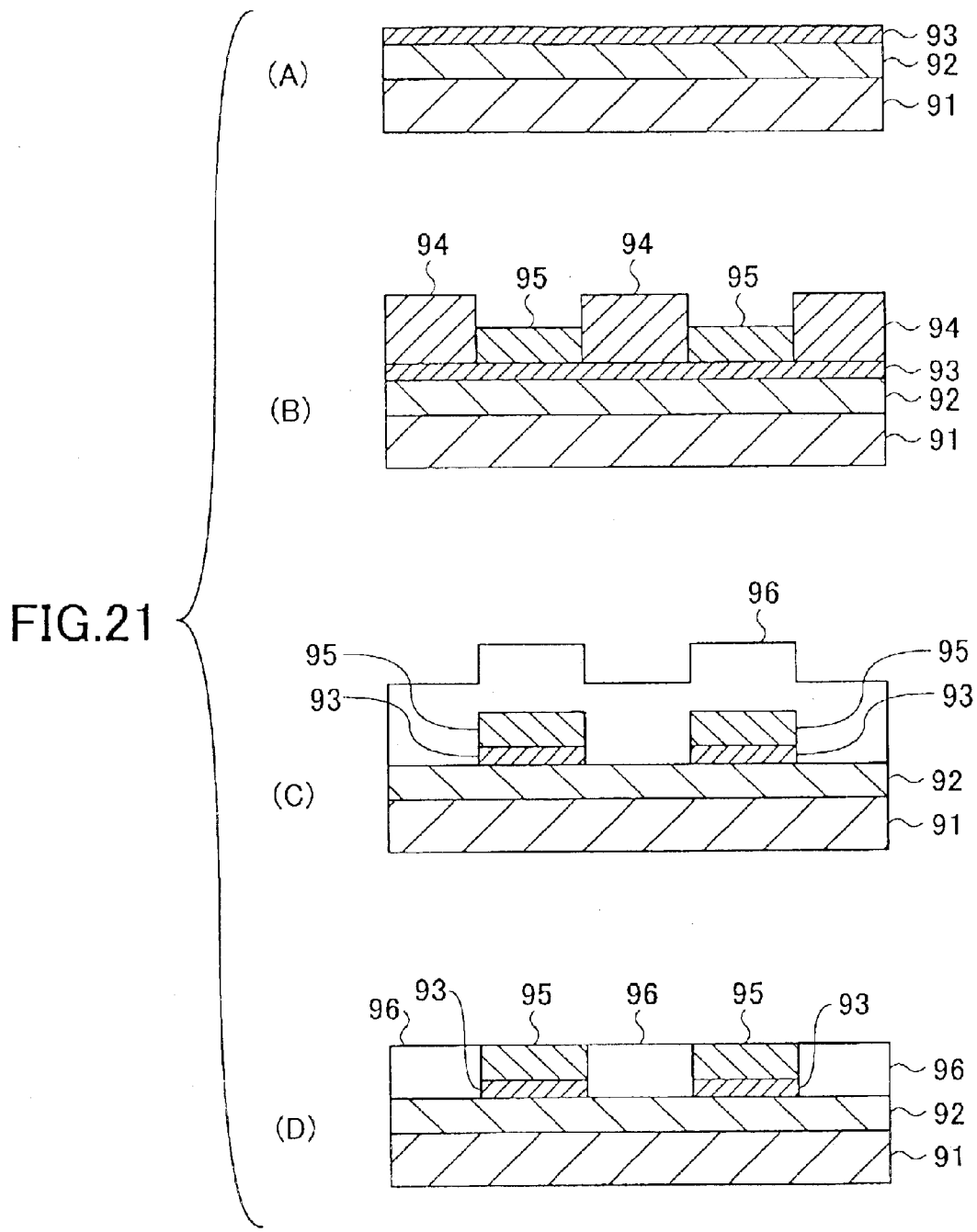
FIG. 21 shows a process for forming a lower shield of a reproduction head of a thin film magnetic head according to an embodiment of the present invention.

FIG. 21 shows a process for forming the lower shield of the reproduction head of the thin film magnetic head.

With reference to Section (A) of FIG. 21, an Al$_2$O$_3$ film 92 with a thickness of 5 $\mu$m is formed by the sputtering method, the CVD method, etc. on an AlTic (Al$_2$O$_3$—TiC) board 91 with a diameter of 6 inches. Next, a NiFe film 93 with a thickness of 1 $\mu$m is formed by the sputtering method etc. on the Al$_2$O$_3$ film 92.

With reference to Section (B) of FIG. 21, on the NiFe film 93, patterning of resist 94 is carried out by the photo lithography method, and an opening for forming the lower shield is formed. Next, by the plating method, the NiFe film 95 with a thickness of 2 μm is formed. Here, the NiFe film is not formed on the resist 94.

With reference to Section (C) of FIG. 21, the resist 94 is removed, and dry etching removes the NiFe film 93 under the resist 94. Next, the $Al_2O_3$ film 96 with a thickness of 4 μm is formed by the CVD method.

With reference to Section (D) of FIG. 21, the $Al_2O_3$ film 96 is polished until the NiFe film 95 is exposed by the CMP method. The polished surface contains the upper surfaces of the NiFe film 95 and the $Al_2O_3$ film 96, and is almost flat. Then, on this polished surface, a GMR (great magnetic resistance) element, serving as a magnetic sensor for reproduction, is formed, and the reproduction head is formed. Since this polished surface serves as the standard surface for the GMR element, and the like, high planarity is required.

Figure 22:
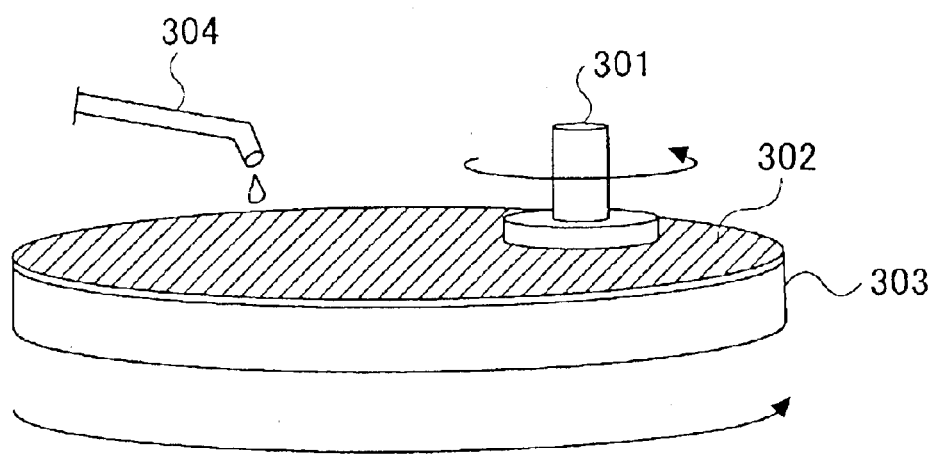
FIG. 22 shows a model configuration of a CMP apparatus.

Here, the polishing is carried out under the following conditions. FIG. 22 shows a configuration of a typical CMP apparatus 300 that includes a polishing head 301 that holds the AlTiC board 91, a polish table 303 on which a polish pad 302 is stuck, and a slurry supply nozzle 304 that supplies slurry. A load on the AlTiC board 91 is set at 3920 Pa, the number of rotations of each the polish head 301 and the polish table 303 is set at about 60 rotations/min., and flow of the slurry supply is set at about 0.1 liters/min. For the polish pad 302, IC1000 made by Rodel Nitta can be used. The slurry is made mainly from alumina grinding grains, and is set with a pH range of 3 to 4.

The level difference between the upper surface of the NiFe film and the upper surface of the $Al_2O_3$ film was evaluated using an AFM (atomic force microscope). The maximum level difference was 25 nm, which is smaller than the 30 nm that was predetermined in the design as the level difference permitted.

According to manufacturing embodiment 3, the arrangement of the NiFe film that forms the lower shield of the thin film magnetic head on the substrate is determined by applying the designing method of the first embodiment, and it becomes possible to obtain satisfactory planarity of the polished surface that consists of the NiFe film and the $Al_2O_3$ film.

In the first embodiment, the second embodiment and the manufacturing embodiments 1 through 3, the activated region or the wiring region is equally divided into the small regions and the large regions. However, adjacent small regions or adjacent large regions may overlap each other for a predetermined amount. Further, only small regions may overlap, or only large regions may overlap. Further, both small regions and large regions may overlap. By overlapping in this manner, the influence of a division starting point can be minimized, and still more precise control of the area ratio is available, such that a further uniform pattern is designed.

Further, the predetermined amount of overlapping is desired to be less than ¾ of the length of a side of a small region or a large region. In this manner, the determination whether an area ratio is permissible can be further precisely made.

As described in full detail above, the present invention prevents a depression from being produced in an area where the polishing speed is higher than other areas, due to differing polishing speeds from place to place, when forming an STI structure, wiring structure, etc. using the CMP method, and offers a high degree of designing flexibility.

Although the preferred embodiments of the present invention have been explained in full detail above, the present invention is not limited to these embodiments, but various variations and modifications may be made without departing from the scope of the present invention.

What is claimed is:

1. An electronic device designing method, comprising:
   (1) a step for dividing a layout region containing both an easy-to-polish region where a polishing speed of chemical mechanical polishing is high, and a difficult-to-polish region where the polishing speed of chemical mechanical polishing is low, into a plurality of first small regions, each of the first small regions occupying a first uniform area,
   (2) a step for obtaining a first area ratio of each of the first small regions, the first area ratio being a ratio of the area of a difficult-to-polish region of the first small region to the first uniform area, comparing the first area ratio with a first predetermined area ratio that secures desired planarity after polishing, adding or expanding the easy-to-polish region if the first area ratio is greater than the first predetermined area ratio, and adding or expanding the difficult-to-polish region if the first area ratio is smaller than the first predetermined area ratio,
   (3) a step for dividing the layout region into a plurality of second small regions, each of the second small regions occupying a second uniform area that is different from the first uniform area, and
   (4) a step for obtaining a second area ratio of each of the second small regions, the second area ratio being a ratio of the area of the difficult-to-polish region of the second small region to the second uniform area, comparing the second area ratio with a second predetermined area ratio that secures desired planarity after polishing, adding or expanding the easy-to-polish region if the second area ratio is greater than the second predetermined area ratio, and adding or expanding the difficult-to-polish region if the second area ratio is smaller than the second predetermined area ratio.

2. The electronic device designing method as claimed in claim 1, wherein at least one of the plurality of the first small regions and the plurality of the second small regions is overlapped with a plurality of adjacent first small regions and a plurality of adjacent second small regions, respectively, which overlapping is by a predetermined amount.

3. The electronic device designing method as claimed in claim 2, wherein the predetermined overlapping amount is equal to or less than ¾ of the length of one side of any one of the small regions.

4. The electronic device designing method as claimed in claim 1, wherein the dimensions of each of the second small regions are greater than the dimensions of each of the first small regions.

5. The electronic device designing method as claimed in claim 1, wherein the area of each of the second small regions is 4 to 16 times the area of each of the first small regions.

6. The electronic device designing method as claimed in claim 1, wherein the easy-to-polish region is a shallow trench isolation region, and the difficult-to-polish region is any region other than the shallow trench isolation region.

7. The electronic device designing method as claimed in claim 1, wherein: any one of the first small regions is a square, one side of which measures about 250 μm; the first predetermined area ratio is between 20% and 80%; any one of the second small regions is a square, one side of which measures about 1000 μm; and the second predetermined area ratio is between 30% and 50%.

8. The electronic device designing method as claimed in claim 1, wherein at least one of the steps (2) and (4) is repeated.

9. A manufacturing method of an electronic device, wherein the electronic device designing method as claimed in claim 1 is used.

10. An electronic device designing method, comprising:
(1) a step for dividing an element formation region that contains an element isolation region and a substrate region that is delimited by the element isolation region, chemical mechanical polishing speed of which element isolation region is different from the chemical mechanical polishing speed of the substrate region, into a plurality of first small regions, each of the first small regions occupying a first uniform area,
(2) a step for obtaining a first area ratio of each of the first small regions, the first area ratio being a ratio of the area of the substrate region of the first small region to the first uniform area, comparing the first area ratio with a first predetermined area ratio that secures desired planarity after polishing, adding or expanding the element isolation region if the first area ratio is greater than the first predetermined area ratio, and adding or expanding the substrate region if the first area ratio is smaller than the first predetermined area ratio,
(3) a step for dividing the element formation region into a plurality of second small regions, each of the second small regions occupying a second uniform area that is different from the first uniform area, and
(4) a step for obtaining a second area ratio of each of the second small regions, the second area ratio being a ratio of the area of the substrate region of the second small region to the second uniform area, comparing the second area ratio with a second predetermined area ratio that secures desired planarity after polishing, adding or expanding the element isolation region if the second area ratio is greater than the second predetermined area ratio, and adding or expanding the substrate region if the second area ratio is smaller than the second predetermined area ratio.

11. An electronic device designing method, comprising:
(1) a step for dividing a wiring region that contains a wiring layer region and an insulation layer region, chemical mechanical polishing speed of which insulation layer region is different from the chemical mechanical polishing speed of the wiring layer region, into a plurality of first small regions, each of the first small regions occupying a first uniform area,
(2) a step for obtaining a first area ratio of each of the first small regions, the first area ratio being a ratio of the area of the insulation layer region of the first small region to the first uniform area, comparing the first area ratio with a first predetermined area ratio that secures desired planarity after polishing, adding or expanding the wiring layer region if the first area ratio is greater than the first predetermined area ratio, and adding or expanding the insulation layer region if the first area ratio is smaller than the first predetermined area ratio,
(3) a step for dividing the wiring region into a plurality of second small regions, each of the second small regions occupying a second uniform area that is different from the first uniform area, and
(4) a step for obtaining a second area ratio of each of the second small regions, the second area ratio being a ratio of the area of the insulation layer region of the second small region to the second uniform area, comparing the second area ratio with a second predetermined area ratio that secures desired planarity after polishing, adding or expanding the wiring layer region if the second area ratio is greater than the second predetermined area ratio, and adding or expanding the insulation layer region if the second area ratio is smaller than the second predetermined area ratio.

* * * * *